(12) United States Patent
Park et al.

(10) Patent No.: US 10,562,260 B2
(45) Date of Patent: Feb. 18, 2020

(54) PNEUMATIC SENSING ACTUATOR

(71) Applicant: PRESIDENT AND FELLOWS OF HARVARD COLLEGE, Cambridge, MA (US)

(72) Inventors: Yong-Lae Park, Medford, MA (US); Robert J. Wood, Cambridge, MA (US); Jobim Jose Robinsantos, Boston, MA (US); Eugene C. Goldfield, Boston, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 722 days.

(21) Appl. No.: 14/762,033

(22) PCT Filed: Jan. 21, 2014

(86) PCT No.: PCT/US2014/012299
§ 371 (c)(1),
(2) Date: Jul. 20, 2015

(87) PCT Pub. No.: WO2014/113781
PCT Pub. Date: Jul. 24, 2014

(65) Prior Publication Data
US 2015/0337874 A1    Nov. 26, 2015

Related U.S. Application Data

(60) Provisional application No. 61/754,681, filed on Jan. 21, 2013.

(51) Int. Cl.
*B32B 3/00*    (2006.01)
*F15B 15/10*    (2006.01)
(Continued)

(52) U.S. Cl.
CPC ............ *B32B 3/00* (2013.01); *B29C 39/123* (2013.01); *B29D 23/001* (2013.01);
(Continued)

(58) Field of Classification Search
CPC ..... B29D 2009/00; F15B 21/06; F15B 21/065
(Continued)

(56) References Cited

U.S. PATENT DOCUMENTS 7,500,399 B2 * 3/2009 Cheng .................. G01B 7/18
73/777
7,891,384 B2   2/2011 Binet et al.
(Continued)

FOREIGN PATENT DOCUMENTS

RU    2224916 C2    2/2004
RU    2255251 C2    6/2005
(Continued)

OTHER PUBLICATIONS

Colbrunn, Thesis: "Design and Control of a Robotic Leg with Braided Pneumatic Actuators", Case Western Reserve University (2000) 141 pp.
(Continued)

*Primary Examiner* — Michael Leslie
*Assistant Examiner* — Daniel S Collins
(74) *Attorney, Agent, or Firm* — Nixon Peabody LLP; Ronald I. Eisenstein; David S. Resnick

(57) ABSTRACT

A pneumatic artificial muscle (PAM) actuator body can be formed from an elastic material that includes an inflatable chamber and a restraining component, such as flexible, but inextensible fibers, that causes the actuator to contract when the chamber is inflated with fluid (e.g., air or water). The actuator body can be cylindrical or flat. The actuator body can include a sensor layer formed of an elastic material including a microchannel filled with a conductive fluid to
(Continued)

sense the expansion of the actuator body. The sensor layer can be configured to expand when the actuator body is inflated causing the electrical resistance of the conductive fluid to change. A sensor layer between the actuator body and restraining component can be used to measure changes in the contraction force of the actuator and a sensor layer outside of the restraining component can be used to measure changes in the length of the actuator.

21 Claims, 15 Drawing Sheets

(51) Int. Cl.
    *B29D 23/00*     (2006.01)
    *B29C 39/12*     (2006.01)
    *F15B 15/28*     (2006.01)
    *B29K 101/00*     (2006.01)
    *B29K 105/14*     (2006.01)
    *B29K 105/24*     (2006.01)

(52) U.S. Cl.
    CPC ........ *F15B 15/103* (2013.01); *F15B 15/2815* (2013.01); *B29D 2009/00* (2013.01); *B29K 2101/00* (2013.01); *B29K 2105/14* (2013.01); *B29K 2105/24* (2013.01); *B29K 2995/0005* (2013.01)

(58) Field of Classification Search
    USPC ...................................... 92/89, 91
    See application file for complete search history.

(56) References Cited

U.S. PATENT DOCUMENTS 8,316,719 B2    11/2012    Majidi et al.

2010/0269689 A1*    10/2010    Nakamura ............ F15B 15/103
    92/92
2012/0118066 A1    5/2012    Majidi et al.

FOREIGN PATENT DOCUMENTS

WO    WO2012/148472    * 11/2012    ................ F15B 7/06
WO    2013/033669 A2    3/2013

OTHER PUBLICATIONS

Daerden et al., "Pneumatic artificial muscles: actuators for robotics and automation", European journal of mechanical and environmental engineering, 47:10-21 (2002).
Davis et al., "Pneumatic muscle actuators for humanoid applications—sensor and valve integration", 2006 6th IEEE—RAS International Conference on Humanoid Robots. IEEE (2006) 6pp.
Park et al., "Active modular elastomer sleeve for soft wearable assistance robots", 2012 IEEE/RSJ International Conference on Intelligent Robots and Systems. IEEE (2012) 8pp.
Park et al., "Bio-inspired active soft orthotic device for ankle foot pathologies", 2011 IEEE/RSJ International Conference on Intelligent Robots and Systems (2011) 8pp.
Park et al., "Design and fabrication of soft artificial skin using embedded microchannels and liquid conductors." IEEE Sensors Journal, 12(8):2711-8 (2012).
Shin et al., "Design and Control of a Bio-inspired Human-friendly Robot", The International Journal of Robotics Research, 29(5):571-84 (2010).
Tondu, "Artificial muscles for humanoid robots, chap. 5." Humanoid Robots-Human like Machines, Advanced Robotics Books, Vienna, Austria (2007): 90-122.
Park et al., "Hyperelastic pressure sensing with a liquid-embedded elastomer", Journal of Micromechanics and Microengineering 20:125029 (2010). (6 pages).

* cited by examiner

FIG. 8A
FIG. 8B
FIG. 8C (MASK)
FIG. 8D
FIG. 8E (SPRAYED PATTERN RELEASE)
FIG. 8F (TOP MOLD)
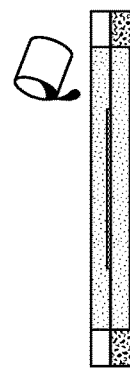
FIG. 8G
FIG. 8H (ZERO-VOLUME AIR CHAMBER (UNBONDED AREA))

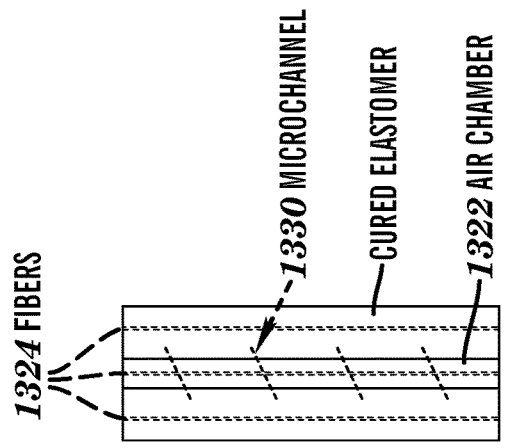
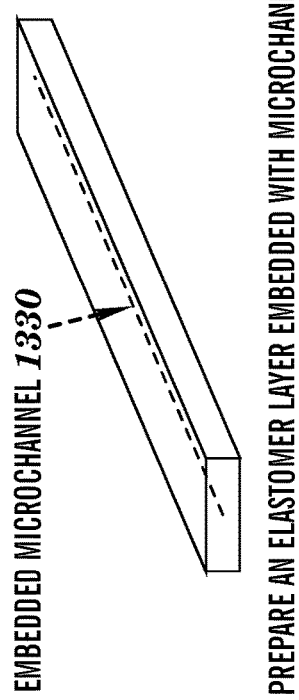
EMBEDDED MICROCHANNEL *1330*
PREPARE AN ELASTOMER LAYER EMBEDDED WITH MICROCHANNEL
*FIG. 14A*
REMOVE THE MOLDS
*FIG. 14C*
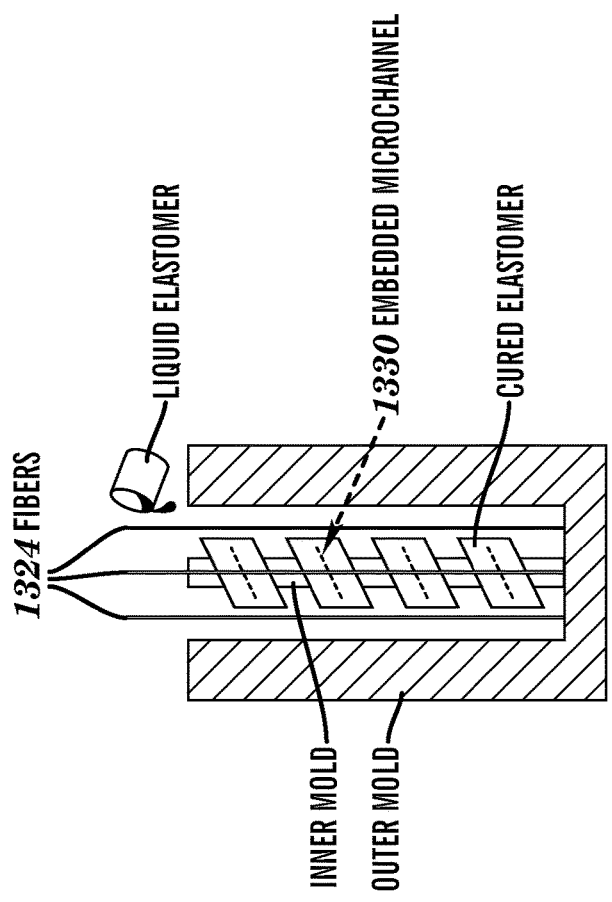
PLACE THE CURED MICROCHANNEL-EMBEDDED ELASTOMER LAYER AND FIBERS *1324* IN A MOLD AND POUR LIQUID ELASTOMER
*FIG. 14B*

PNEUMATIC SENSING ACTUATOR

CROSS-REFERENCE TO RELATED APPLICATIONS

This application is a 35 U.S.C. § 371 National Phase Entry Application of International Application No. PCT/US2014/012299 filed Jan. 21, 2014, which designates the U.S., and which claims the benefit under 35 U.S.C. § 119(e) of the U.S. Provisional Application No. 61/754,681 filed Jan. 21, 2013, the contents of each of which are incorporated herein by reference in their entirety.

This application is related to U.S. patent application Ser. No. 12/945,014, entitled Stretchable Two-Dimensional Pressure Sensor, now U.S. Pat. No. 8,316,719, and PCT Patent Application no. PCT/US2012/053569, designating the US, entitled Actively Controlled Wearable Orthotic Devices and Active Modular Elastomer Sleeve for Wearable Orthotic Devices, the contents of each application is hereby incorporated by reference in its entirety.

GOVERNMENT SUPPORT

This invention was made with government support under grant no. CNS 0932015 awarded by U.S. National Science Foundation. The government has certain rights in the invention.

REFERENCE TO MICROFICHE APPENDIX

Not Applicable

BACKGROUND

Technical Field of the Invention

The present invention is directed to pneumatic artificial muscle actuators including embedded sensors that enable control of the actuators in real time.

Description of the Prior Art

Pneumatic artificial muscle (PAM) actuators are used to provide mechanical actuation in various fields, such as, robotics. The actuator typically includes a cylindrical tube extending along an axis, sealed at both ends, formed from an elastic material, such as rubber or silicon. A pneumatic inlet is provided to enable a fluid, such as a gas or liquid to be injected into the tube causing the tube to expand. The tube also includes flexible, but inextensible fibers or other material that prevents the tube from expanding along the axis. Typically, the fibers are fastened at each end of the tube. As a result, when air is injected into the inlet, the tube expands radially, in a direction transverse to the axis and contracts in length along the axis. When the air is released, the tube contracts radially and extends axially. In this way, the actuator can be used to cause a device, such as a robotic arm to move.

One of the drawbacks of these pneumatic actuators is that they can be difficult to control with respect to position (contraction length) and force (contraction force) due to their inherent nonlinear behavior. Extrinsic sensors, for example, located on the joint or elsewhere on the device, external to the actuator can be used. However, these extrinsic sensors make the system bulky, heavy, and complex, outweighing any potential advantages of using relatively small and light weight pneumatics for actuation.

SUMMARY

The present invention is directed to mechanical actuators that include embedded sensors that enable control of the actuator in real-time. The actuators can include pneumatic actuators that contract along a working axis in response to fluid being injected into a chamber or cavity that can expand in a dimension transverse to the axis. The actuators can include restraining elements, such as flexible but inextensible fibers, such as cables or Kevlar fibers, that react to the expanding cavity to contract the actuator along the axis. These actuators can be used as artificial muscles to actuate mechanical devices, such as robotics and prosthetics.

In accordance with various embodiments of the invention, the pneumatic artificial muscle actuator can be provided with integrated sensing capabilities inspired by—muscle spindles and Golgi tendon organs—receptor organs that provide the means for elegant control loops in biological systems. In accordance with the invention, the integrated sensors can measure the change in length and the change in tension force of the PAM actuator.

In accordance with one embodiment of the invention, the pneumatic actuator can be formed from an elastic material that includes a chamber extending along an axis from a first end to a second end. The actuator can include an inlet connected to the chamber to enable a fluid to be injected into the chamber. The actuator can include a plurality of flexible fibers coupled to the first end and the second end that prevent the actuator for extending along the axis. The actuator can also include a first sensor layer positioned along the actuator between the first end and the second end and coupled to the actuator, whereby when a fluid is injected into the chamber causing the chamber to expand, the first sensor layer is caused to expand and wherein the first sensor layer includes a first microchannel containing a conductive liquid extending along a portion of the actuator whereby expansion of the first sensor layer causes a change in at least one dimension of the microchannel and a change in electrical resistance of the conductive liquid in the first microchannel.

These and other capabilities of the invention, along with the invention itself, will be more fully understood after a review of the following figures, detailed description, and claims.

BRIEF DESCRIPTION OF THE FIGURES

FIG. 4 shows the fabrication process for embedding a helical microchannel in an elastomer tube. The elements of the process can include (a) Prepare outer and inner molds; (b) Pour liquid elastomer, and when the elastomer cures; (c) Remove the outer mold; (d) Wrap the cured elastomer tube with a thin and low-friction fiber in a helical shape; (e) Prepare the second outer mold. (f) Pour liquid elastomer. (g) Remove outer and inner molds when the second poured elastomer cures. (h) Pull the low-friction fiber out from one end making the helical trace (microchannel) in the elastomer tube.

FIG. 8 is a diagram of a method for making an alternative embodiment of a pneumatic actuator according to the invention.

FIG. 11(a) shows a front side showing the first sensor layer (layer 3a in FIG. 6) above the Kevlar fibers; and FIG. 11(b) shows the back side showing the second sensor layer (layer 1b in FIG. 6) below the Kevlar fibers.

FIG. 12(a) shows a prototype; FIG. 12 (b) shows a relaxed actuator; and FIG. 12(c) shows a contracted actuator.

FIG. 13(a) shows the characterization setup; and FIG. 13(b) shows the characterization result showing force and contraction length responses with different air pressure.

FIGS. 14A, 14B and 14C show an alternative method of making a pneumatic actuator according to the present invention.

DETAILED DESCRIPTION OF PREFERRED EMBODIMENTS

The present invention is directed to an actuator that includes integrated sensing and can provide real-time reporting of position and force to provide real-time control of the actuator. The actuator can be provided in different embodiments according to the application.

Figure 1:
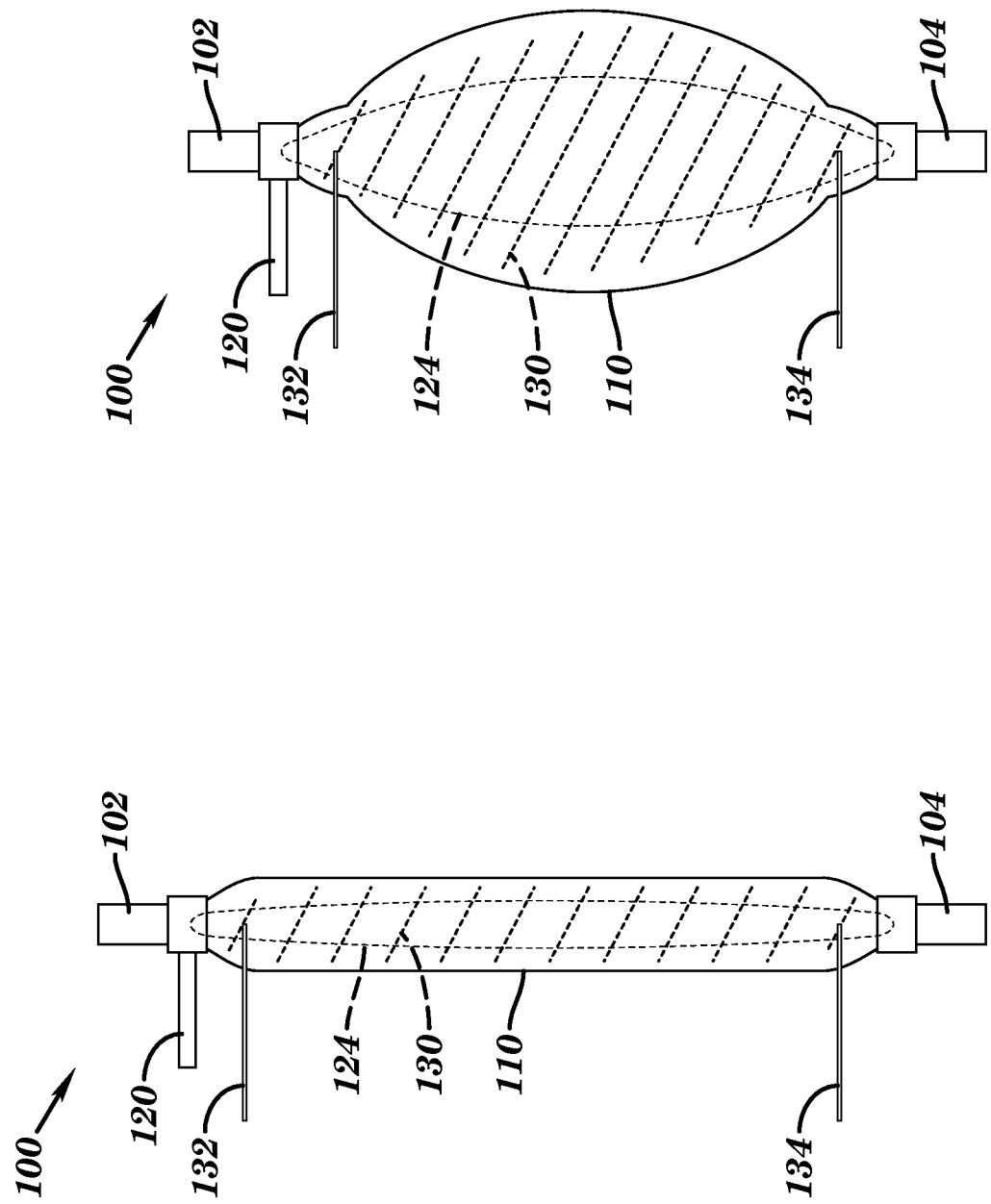
FIG. 1A is a diagram of an embodiment of a pneumatic actuator in the unactuated/relaxed position according to the invention.
FIG. 1B is a diagram of an embodiment of a pneumatic actuator in the actuated position according to the invention.

FIGS. 1A and 1B show one embodiment of an integrated actuator 100 according to the invention. FIG. 1A shows the integrated actuator 100 in a relaxed or unpressurized state. FIG. 1B shows the integrated actuator 100 in a contracted or pressurized state. In accordance with some embodiments of the invention, the actuator 100 can include an actuator body 110 that extends between a first end 102 and a second end 104, an includes an inlet 120 to enable a fluid, such as a gas or liquid to be injected into the central cavity or chamber inside the actuator 100.

In accordance with some embodiments of the invention, the actuator body 110 can be formed by one or more layers of an elastomer material that can expand when a fluid is injected into the cavity of the actuator 100 and then return to the relaxed or unpressurized state when the fluid is released and allowed to escape the cavity. In some embodiments, the elastomer material can include a high elasticity silicone rubber such as Dragon Skin from Smooth-on, Inc., Easton, Pa. The elastomer material can be selected from a wide range of elastomer materials, including rubber, silicon, polyurethane and PDMS.

In operation, the actuator 100 can extend and contract along an axis that extends between the first end 102 and the second end 104. The first end 102 and second end 104 can include any known fastening element to allow the ends to be attached to a device to be actuated. The ends 102 and 104 can, for example, include loops to allow them to be bolted to an actuated device or include threaded posts that enable them to be connected to a threaded hole or by use of a mating nut or other internally threaded element.

In accordance with some embodiments of the present invention, the actuator body can include a restraining component that is adapted to cause the actuator to contract along an axis in response to an expansion force applied transverse to the axis. The restraining component, for example, can be constructed from fibers, cords, cables, sheets or mechanical linkages or a combination of mechanical linkages and fibers, cords, cables or sheets.

In accordance with some embodiments of the invention, the actuator body 110 can include a restraining component that includes one or more flexible, but inextensible fibers 124 that are positioned along or parallel to the axis that extends between the first end 102 and the second end 104. One or more of the fibers 124 can be connected, directly or indirectly to each of the ends 102 and 104. The fiber 124 can be used to prevent the actuator 100 from extending in length when fluid is injected into the cavity or chamber. However, the fibers 124 enable the actuator 100 to expand radially, transverse to the axis that extends between the ends, causing the actuator to contract axially pulling the ends 102 and 104 together. The fibers 124 can be embedded into the flexible material that forms the actuator body 110 or be positioned outside of at least one layer of material that forms the actuator body 110. In accordance with some embodiments of the invention, the fibers can be Kevlar™ fibers, cord or cables, metal cables (e.g., steel cable), or other flexible, but substantially inextensible materials. In addition to cables or fibers, the fiber materials can be woven into a fabric or sheet configuration.

A fluid control system can be provided to control the flow of fluid into the actuator 100. The inlet 120 can be provided in the form of an inlet tube 120 or connection for connecting a hose or other conduit that enables the fluid to be injected into the cavity inside the actuator 100. A valve or other fluid flow control element can be coupled to the inlet to control the flow of fluid into and out of the actuator 100. In accordance with some embodiments, the fluid can be a gas, such as, air or a liquid, such as water or hydraulic fluids. Other gases, such as inert gases, or liquids can be used depending on the environment.

In operation, a fluid under pressure can be allowed to flow into the central cavity or chamber of the actuator body 110 causing it to expand radially, transverse to the axis of the body 110. The expansion causes the fibers to expand radially as well, shortening the distance between the ends of the fibers, causing the body 110 to contract in length along the axis as shown in FIG. 1B. When the fluid is released or allowed to escape the central cavity or chamber of the actuator body 110, it extends along the axis and returns to its initial state as shown in FIG. 1A. In accordance with the invention, the fluid can be any gas or liquid, including, for example, air and water. The fluid selected for a given application can be selected as a function of on the environment and forces required.

In accordance with some embodiments of the invention, the actuator body 110 can include one or more sensing elements integrated into the actuator body material. The sensing elements can be components that can be used to report a change in a physical dimension of the actuator body 110.

In accordance with some embodiments of the invention, the sensing elements can include one or more microchannels 130 embedded in the actuator body 110 that includes a conducting liquid that changes electrical resistance when the actuator body 110 expands. Wires can be connected to the ends of the microchannels 130 to measure the change in resistance as the actuator body 110 contracts and extends. In accordance with some embodiments, the microchannel 130 can be formed in a spiral or helix that extends around at least a portion of the actuator body 110 and axially along at least a portion of the actuator body 110. In accordance with some embodiments, more than one microchannel 130 can be provided and the microchannels can be provided in any of the layers of the actuator body 110.

Figure 2:
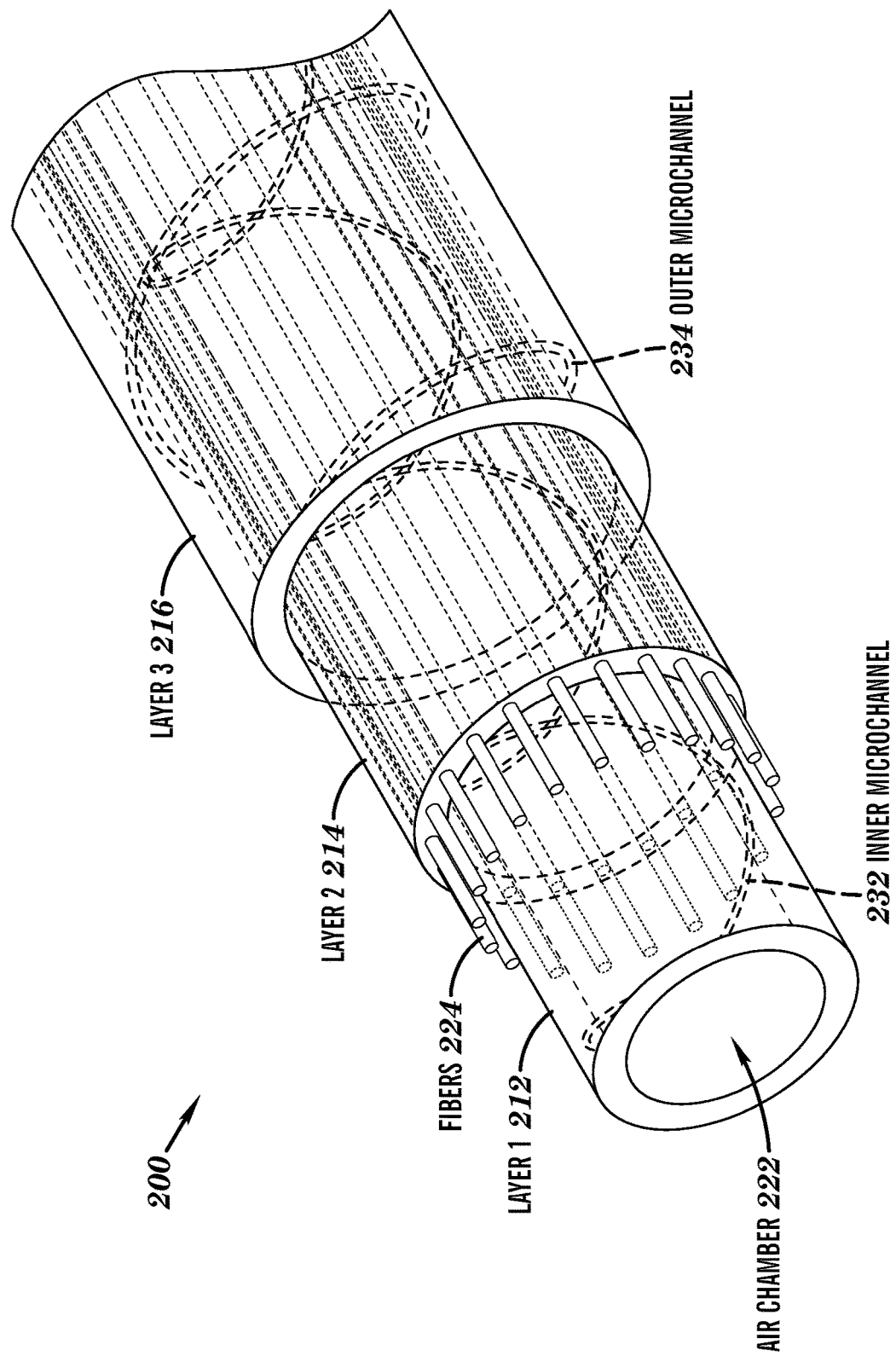
FIG. 2 is a diagram showing the layers an embodiment of a pneumatic actuator according to the invention.

FIG. 2 is a diagram depicting the layers that can be provided in an actuator 100 according to some embodiments of the invention. In these embodiments, the actuator body 110 can be constructed from 3 or more layers of flexible material. The inner most layer, layer 1 212 can enclose the air chamber 222 that can be connected to inlet 120. Layer 1 212 can be formed from an elastomer and include one or more microchannels, such as microchannel 232 formed in a helix or spiral around the air chamber 222. In accordance with some embodiments, the microchannel 232 can be filled with a non-toxic conducting liquid, e.g. eutectic Gallium-Indium (eGaIn) or eutectic Gallium-Indium-Tin (Galinstan). The second or middle layer, layer 2 214, can include flexible, but inextensible fiber 224 that extend parallel to the axis of the actuator and can be fixed at both ends 102, 104 of the actuator body 110. The fibers 224 can be embedded in a flexible material as shown or can simply be positioned between the inner layer, layer 1 212 and the outer layer, layer 3 216. The outer layer, layer 3 216 can be formed from an elastomer and include one or more microchannels, such as microchannel 234 formed in a helix or spiral around layer 2 214 or the fibers 224. As with microchannel 232, the microchannel 234 can also be filled with a non-toxic toxic conducting liquid, e.g. eutectic Gallium-Indium (eGaIn) or eutectic Gallium-Indium-Tin (Galinstan). Wires, not shown, can be connected to each end of the microchannel and in electrical contact with the conducting liquid to enable a control system to measure a change in the electrical resistance of the conducting liquid as the actuator expands and relaxes.

Figure 3B:
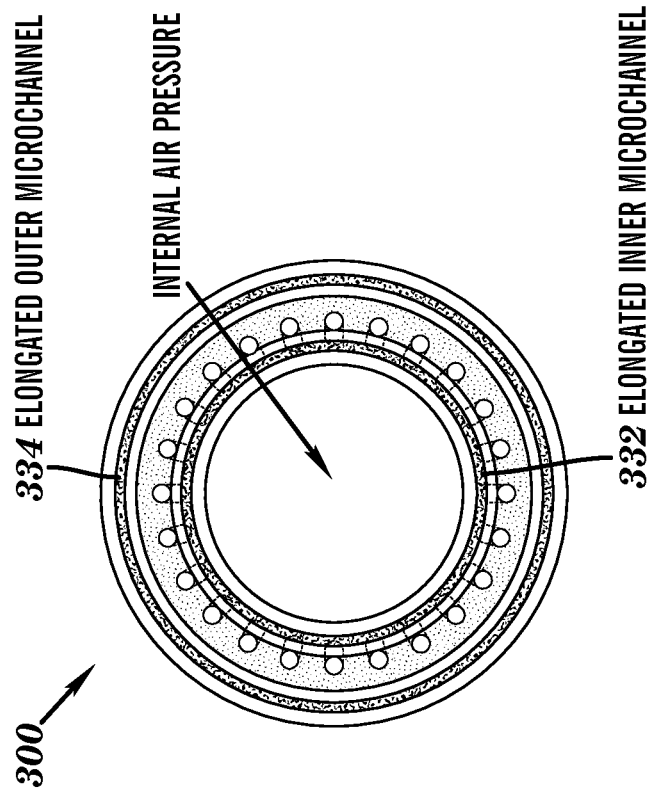
FIG. 3B is a diagram of a cross-section of an embodiment of a pneumatic actuator in the actuated position according to the invention.

In operation, when the actuator contracts, microchannel 232 and microchannel 234 containing liquid metal in the both inner (layer 1 212) and outer layer (layers 3 216) are stretched, as shown in FIG. 3B, and the electrical resistance of the liquid conductor increases. This resistance change can be used to determine the axial displacement of the actuator (actuator contraction) by empirically determining the resistance at two or more displacements and estimating or extrapolating intervening positions.

Figure 3A:
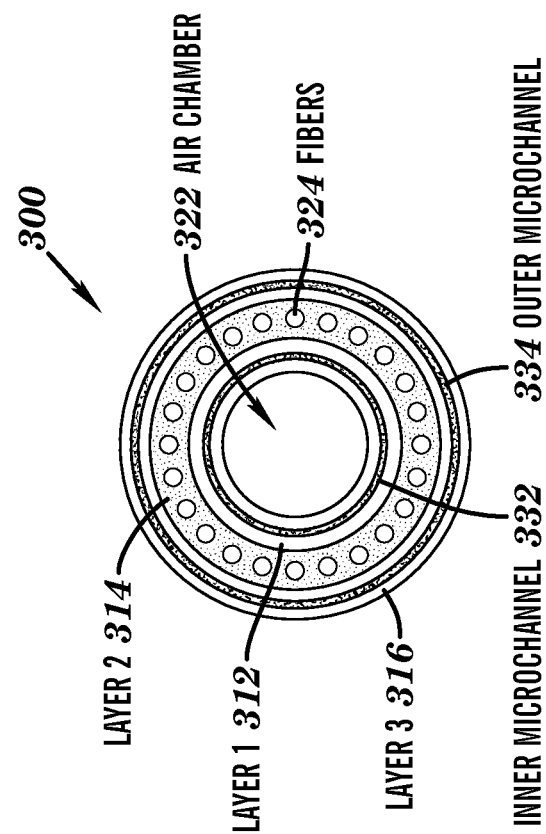
FIG. 3A is a diagram of a cross-section of an embodiment of a pneumatic actuator in the unactuated/relaxed position according to the invention.
Figure 4A:
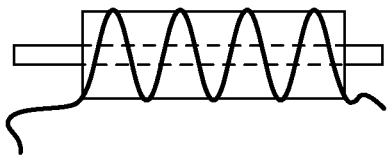
FIG. 4 is a diagram of a method for making an embodiment of a pneumatic actuator according to the invention.
Figure 4B:
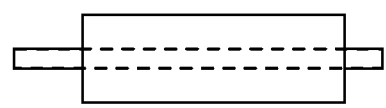
Figure 4C:
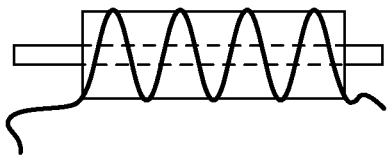
Figure 4D:
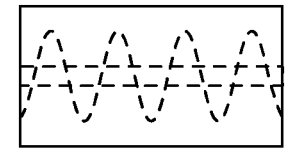
Figure 4E:
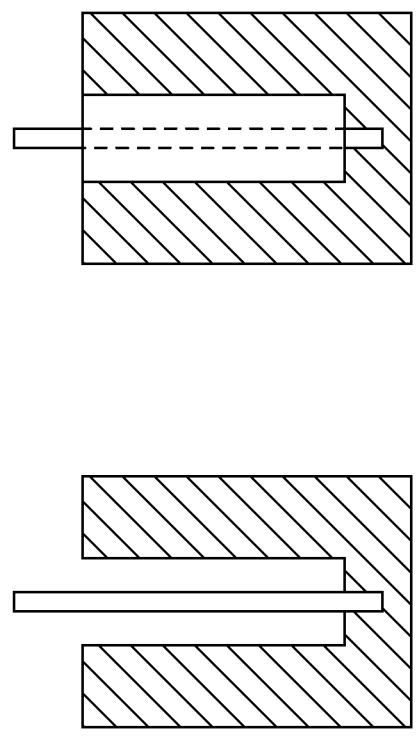
Figure 4F:
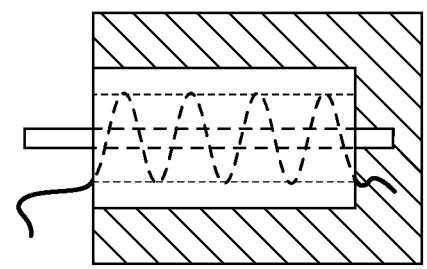
Figure 4G:
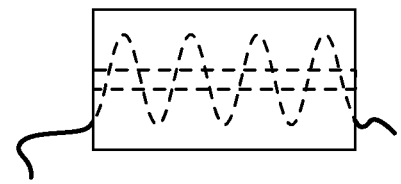
Figure 4H:
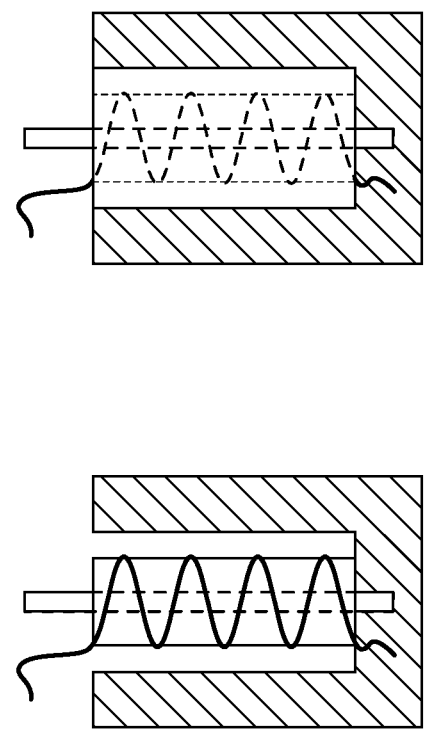

The operation of the pneumatic actuator 100, 200 can be better understood by evaluating the differential effect of compressed air (or fluid) on the behavior of the inner microchannel 332 and outer microchannel 334. When the two ends of the actuator are fixed, as compressed air enters the air chamber, the overall geometry of the muscle remains almost the same, but the pressure of the air chamber increases. The result is that the inner layer (Layer 1 312) is pushed out by the internal air pressure, but at the same time is compressed by the fibers 324. The fibers 324 cover only certain areas of the inner microchannel 332. Those areas of the inner microchannel 332 that are covered by (e.g. intersect) the fibers 324 are compressed and deformed, compare FIG. 3A with FIG. 3B. The overall effect is an increase in electrical resistance of the inner microchannel 332 of the inner layer (Layer 1 312). However, the electrical resistance change of the outer microchannel 334 is little because this microchannel is neither elongated nor compressed. If the load on the muscle is very low impedance, the resistance increases in the two microchannels are almost the same, but if the load is higher impedance then the two microchannels give different responses with a larger resistance increase in the inner microchannel. Therefore, using these two microchannels, the system can determine the contraction length, the load and the contraction force at the same time.

In accordance with some embodiments of the invention, the outer microchannel 334 can be used for measuring the change in length of the actuator 100, and the inner microchannel 332 can be used for measuring the change in contraction force of the actuator 100. If the length and force change happen simultaneously, the sensor signal of the outer microchannel 334 can be subtracted from that of the inner microchannel 332 to measure contraction force because the inner microchannel is experiencing both elongation and compression at the same time.

In accordance with some embodiments of the invention, the force and displacement of the actuator 100 can determined empirically by placing the actuator 100 in a fixture that measures the contraction force as air pressure is applied to the actuator 100. By fixing the second end 104 and attaching the first end 102 to a scale, such as a spring scale, the force and length of the actuator can be measured as different amounts of pressure is applied. Using 2 or more data points, the force and displacement can be determined from the empirical data.

FIG. 4 illustrates one example of the fabrication process for making helical microchannels embedded in an elastomer actuator body 110, according to some embodiments of the invention. The number of turns in the helix can be used to select the sensitivity, with the more turns providing higher sensitivity. In accordance with this embodiment of the invention, the channel can be formed within the elastomer by keeping a wrapped low-friction fiber having a diameter or cross-sectional dimension of 125 micrometers (e.g., Dyneema or Spectra) in place when the elastomer is in its liquid state, and then removing the fiber when the elastomer is cured. In other embodiments, the low-friction fiber can have a diameter or cross-sectional dimension of in the range from 50 to 1000 micrometers In accordance with some embodiments of the invention, the microchannels can be formed having a cross-section dimension in a range from 50 micrometers to 1000 micrometers. The dimensions of the microchannels 332 and 334 can be determined based on the application, including the amount of force to be applied and dimensions of the actuator itself. In accordance with one embodiment of the invention, a pattern that can be used as a guide for the location of the low-friction fiber can be made in the outer mold shown in FIG. 4 to make the location of the microchannel more consistent. The mold can include an inner post and an outer mold as shown in step 4(a). The elastomer material, in liquid form, can be poured or injected into the mold and allowed to cure as shown in step 4(b). The cured elastomer layer can be removed from the mold as shown in FIG. 4(c). The helical microchannel pattern in the outer mold provides the location on the cured inner tube for insertion of a filler element or material, such as, a low-friction fiber or cord (e.g., Dyneema, available from DSM Dyneema LLC, Stanley, N.C. or Spectra, available from Honeywell International, Colonial Heights, Va.), as shown in step 4(d). The cured inner tube with the low-friction fiber is inserted into a larger outer mold at step 4(e) and an outer layer of elastomer is applied at step 4(f). After the outer layer is cured, the completed layer is removed from the outer mold (and the inner post is removed) at 4(g). The low-friction fiber can be removed from the completed layer at step 4(h), leaving the complete layer with a microchannel to be filled with a conductive liquid. The mold components can be formed, for example, using a 3-D printer.

Figure 5A:
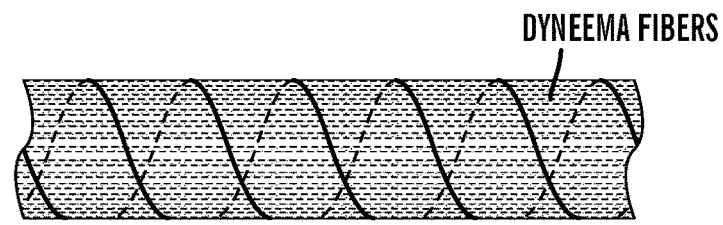
FIG. 5 is a diagram of showing an embodiment of a pneumatic actuator at various stages in the fabrication process according to the invention.
Figure 5B:
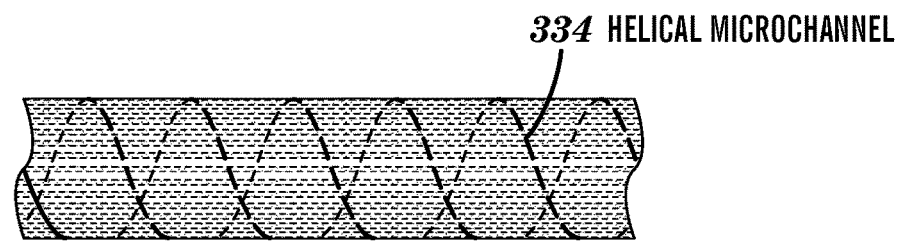
Figure 5C:
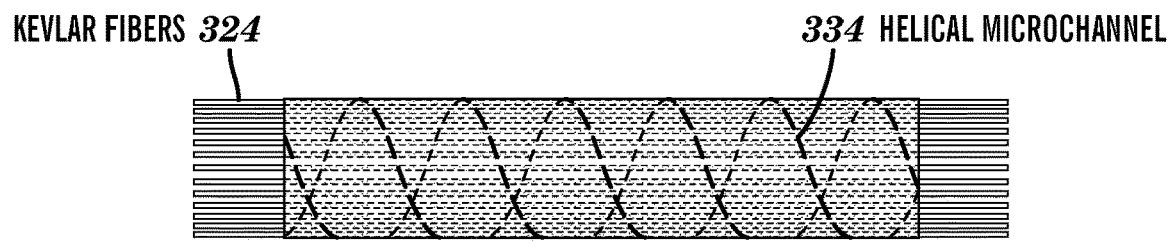
Figure 5D:
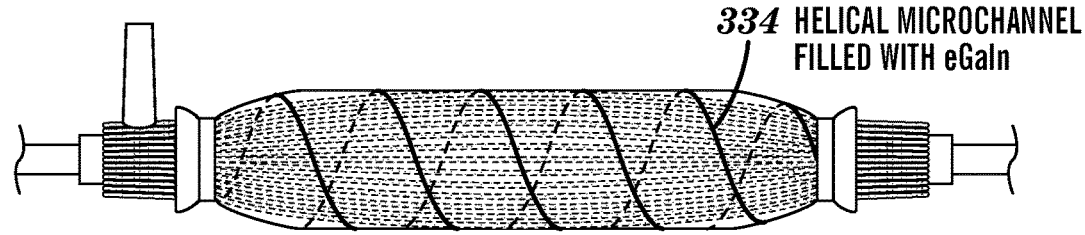

Examples of an elastomer tube with embedded helical microchannels are shown in FIGS. 5(a)-5(d). FIG. 5(a) shows, according to one embodiment of the invention, an elastomer tube in a 3D printed mold with embedded Dyneema and Kevlar fibers. FIG. 5(b) shows the elastomer tube after removing Dyneema fibers. FIG. 5(c) shows the elastomer tube after removing the elastomer tube from the 3-D printed mold. FIG. 5(d) shows an example of an actuator according to an embodiment of the invention having a pneumatic fitting, eGaIn conducting liquid injected in the helical microchannel and wires connected to the eGaIn conducting liquid.

The sensing actuator according to the invention can also be used to mimic the function of natural muscles, without being limited by its cylindrical form. This embodiment of the invention can be used in applications in which the muscle mimic can be embedded in material that surrounds a portion of the body, for example, in active physical therapy and active prosthetic applications. In accordance with the invention, the sensing actuator can be formed, similar to a biological muscle, in a substantially two-dimensional or flat configuration. The flat configuration remains substantially flat when in its relaxed state providing a highly compact actuator that adds little additional volume so that it can be incorporated in a brace or a suit worn on the body.

Figure 6A:
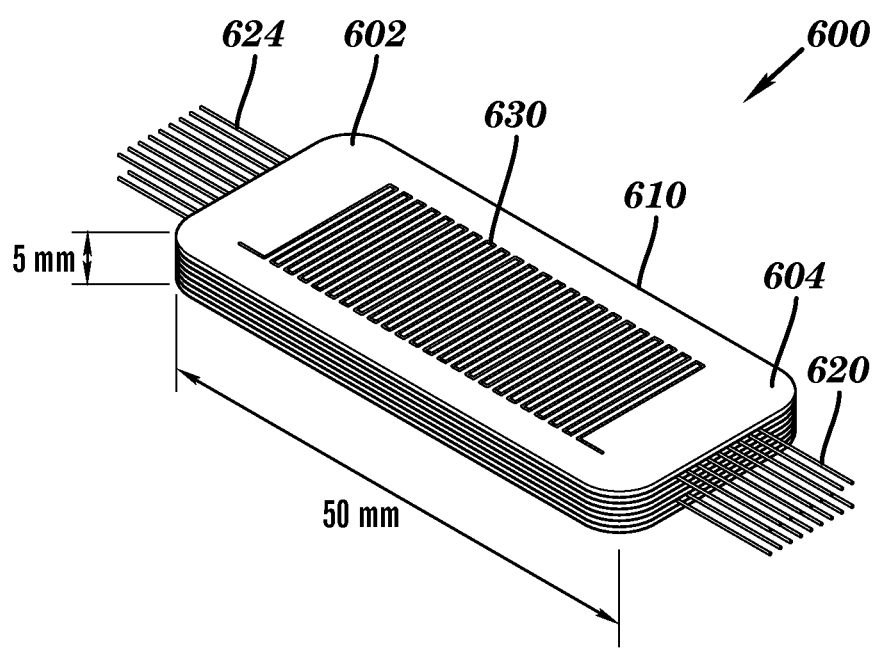
FIG. 6A is a diagram of an alternative embodiment of a pneumatic actuator according to the invention.
Figure 6B:
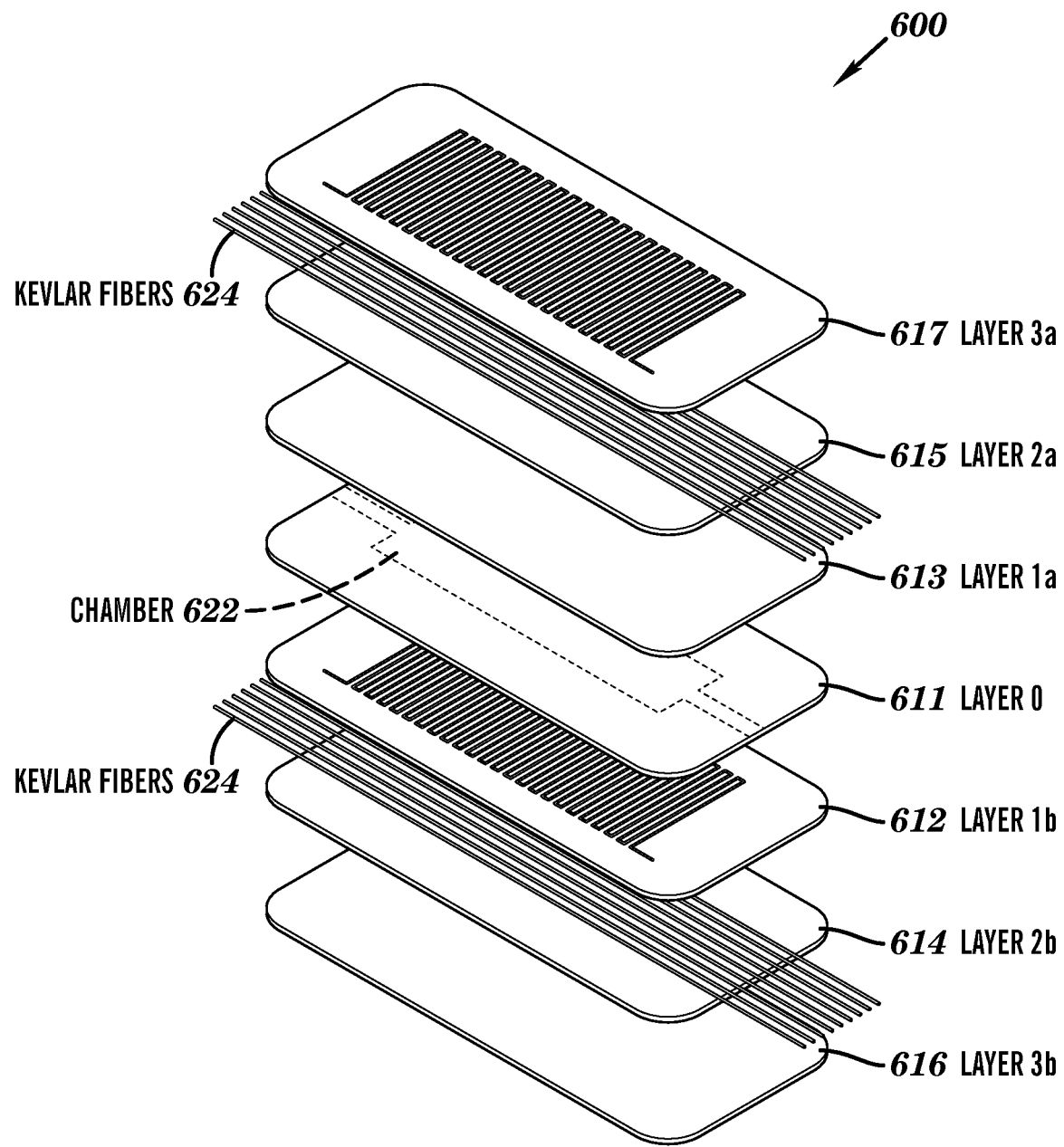
FIG. 6B is a diagram showing the layers an alternative embodiment of a pneumatic actuator according to the invention.

FIGS. 6A and 6B show a pneumatic actuator 600 according to an alternative embodiment of the invention. This embodiment is similar to the structure of the actuator shown in FIG. 1, except that it has a two-dimensional flat configuration with multiple stacked layers that make-up the actuator body 610. Like the actuator shown in FIGS. 1A and 1B, the actuator body 610 extends along an axis from a first end 602 to a second end 604. The ends 602 and 604 can include fastening or attachment elements (not shown) that enable the ends to be securely fastened to a device to be actuated.

In accordance with some embodiments, the actuator body 610 can include one or more layers of one or more flexible, but inextensible fibers 624 that are positioned along or parallel to the axis that extends between the first end 602 and the second end 604. One or more of the fibers 624 can be connected, directly or indirectly to each of the ends 602 and 604. The fibers 624 can be used to prevent the actuator 600 from extending in length when fluid is injected into the cavity or chamber. However, the fibers 624 enable the actuator 600 to expand radially, transverse to the axis that extends between the ends 602 and 604, causing the actuator to contract axially pulling the ends 602 and 604 together. The fibers 624 can be embedded into one or more of the layers of flexible material that forms the actuator body 610 or be positioned outside of at least one layer of material that forms the chamber, layer 0 611 of the actuator body 610. As shown in FIG. 6B, the fibers 624 can, for example, be embedded into layer 2a 615 and layer 2b 614 of the actuator body 610. Alternatively, the material that forms layer 2a 615 and layer 2b 614 can be omitted and the fibers 624 can be bonded in-place when layer 3a 617 is bonded to layer 1a 613 and when layer 3b 616 is bonded to layer 1b 612.

A fluid control system can be provided to control the flow of fluid into the actuator 600. The inlet 620 can be provided in the form of an inlet tube or connection 620 for connecting a hose or other conduit that enables the fluid to be injected into the cavity or chamber inside the actuator 600. A valve or other fluid flow control element can be coupled to the inlet 620 to control the flow of fluid into and out of the actuator 100.

Figure 7B:
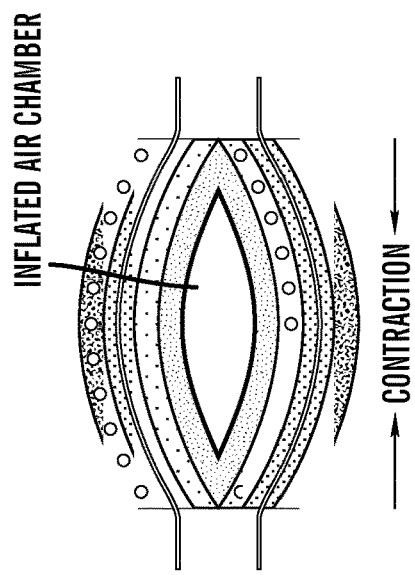
FIG. 7B is a diagram of a cross-section of an alternative embodiment of a pneumatic actuator in the actuated position according to the invention.
Figure 7A:
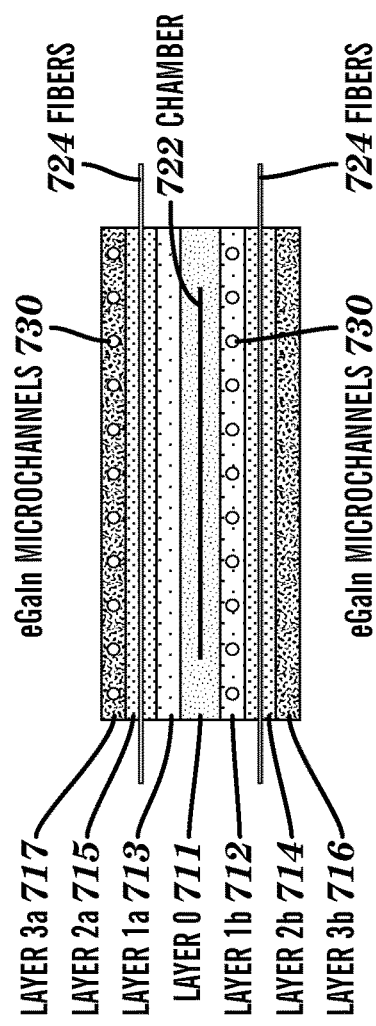
FIG. 7A is a diagram of a cross-section of an alternative embodiment of a pneumatic actuator in the unactuated/relaxed position according to the invention.
Figure 9A:
FIG. 9 is a diagram of a method for making an alternative embodiment of a pneumatic actuator according to the invention.
Figure 9B:
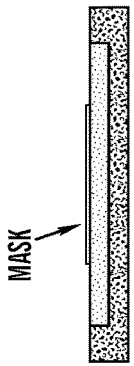
Figure 9C:
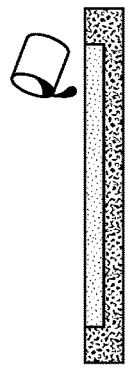
Figure 9D:
Figure 9E:
Figure 9F:
Figure 9G:
Figure 9H:
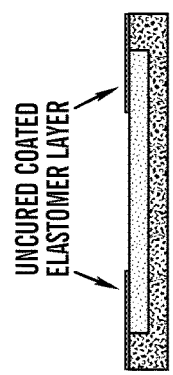

FIG. 6B shows an exploded view of the pneumatic actuator 600 according to an alternative embodiment of the invention. The inner most layers is layer 0 611 which includes a zero-volume fluid chamber in the middle of the layer. Layer 0 611 can be formed from two flat sheets of material that are bonded together with a specific area in the middle that prevents the two layers from being bonded during the fabrication. Like a bladder that has been pressed flat, this middle area has no volume when it is not inflated. However, it inflates when a fluid, such as, compressed air, is injected inside, and the fixed length of the fibers makes the muscle contract in the axial direction of the fibers, as shown in FIGS. 7A and 7B. The zero-volume fluid chamber enables the actuator to be compact in its relaxed state. It is not necessary that the fluid chamber in layer 0 be zero volume.

In accordance with some embodiments of the invention, the actuator body 610 can include layers above and below layer 0 611 that includes the fluid chamber. As shown in FIG. 6B, the actuator body 610 can include layer 1a 613, layer 2a 615 and layer 3a 617 above layer 0 and layer 1b 612, layer 2b 614 and layer 3b 616 below layer 0. In accordance with some embodiments of the invention, some of these layers can be omitted depending upon the application of the actuator.

In accordance with some embodiments of the invention, one or more of the layers of the pneumatic actuator 600 can include microchannels 630 that contain a conductive liquid that changes electrical resistance as the layer stretches to enable position and force sensing. The microchannel 630 embedded eGaIn or Galinstan sensing layers, inner (layer 1b 612) and outer (layer 3a 617) of the actuator 600 can detect both the contraction length and force changes of the muscle in the same way as described for the embodiment of FIGS. 1A, 1B and 2. In accordance with some embodiments of the invention, the microchannels 630 are formed in a flat material according to a pattern that results in a change in one or more physical dimensions of the microchannel when the layer is stretched as fluid is injected into the fluid chamber. FIGS. 6A and 6B show that the microchannel forms a "zig-zag" pattern that can extend from proximate the first end 602 to proximate the second end 604, but traverses back and forth across the surface, transverse to the axis of the actuator 600.

FIGS. 7A and 7B show a cross-section of the actuator 600 of FIG. 6 in the relaxed state and the expanded state, respectively. As shown in FIG. 7A, the actuator 700 can be substantially flat with each layer, extending substantially parallel to the next. As shown in FIG. 7B, when the fluid chamber is inflated, each of the layers expands transverse to the axis of the actuator body 610 and causing the fibers 724 in layer 2b 614 to bear against the microchannels 630 in layer 1b 612, changing the electrical resistance differently than that of microchannels 630 in layer 3a 617. This enables the microchannels 630 in layer 1b 612 to be used to measure the change in the contracting force and the microchannels 630 in layer 3a 617 to be used to measure the change in the length of the actuator. Where the length and force change happen simultaneously, the sensor signal of the outer layer, layer 3a 617 can be subtracted from that of the inner layer, layer 1b 612 to measure contraction force because the microchannel in inner layer, layer 1b 612 is experiencing both elongation and compression at the same time.

One example of the fabrication process for making a zero-volume fluid chamber is shown in FIG. 8. The fabrication process, shown in FIG. 8, to make a zero-volume air chamber includes: (a) Prepare the bottom mold; (b) Pour the liquid elastomer and allow it to cure; (c) Position the negative mask on the cured elastomer. (d) Spray the pattern release material. A pattern release material is sprayed on the unmasked area to prevent the bottom layer from becoming bonded to the top layer. (e) Remove the mask; (f) Place the second top mold on the bottom mold; (g) Pour the liquid elastomer; and (h) Remove top and bottom mold when the elastomer cures. The release material will prevent the top layer from adhering to the bottom layer in area of the chamber. An inlet can either be fabricated into the layer, e.g., using the release material, providing an inlet tube or cutting, drilling or boring into the chamber. A cleaning fluid can be introduced into the chamber to remove the release material, if necessary.

An alternative fabrication method is shown in FIG. 9. Instead of using pattern release spray, a positive mask prevents the liquid elastomer from being coated. The alternative fabrication process of FIG. 9 to make a zero-volume fluid chamber includes: (a) Prepare the bottom mold. (b) Pour the liquid elastomer and allow it to cure. (c) Place the positive mask. (d) Spin coat a layer of liquid elastomer. (e) Remove mask. (f) Partial bake. (g) Laminate a cured top layer onto the bottom layer. (f) Remove mold when the elastomer layer cures. While the method of FIG. 8 repeats pouring processes, the method of FIG. 9 requires a bonding process of two cured layers. These fabrication methods for zero-volume air chambers can be also used for making zero-volume microchannels for sensing as an alternative to the molding and casting process.

EXAMPLES

Figures 10A, 10B:
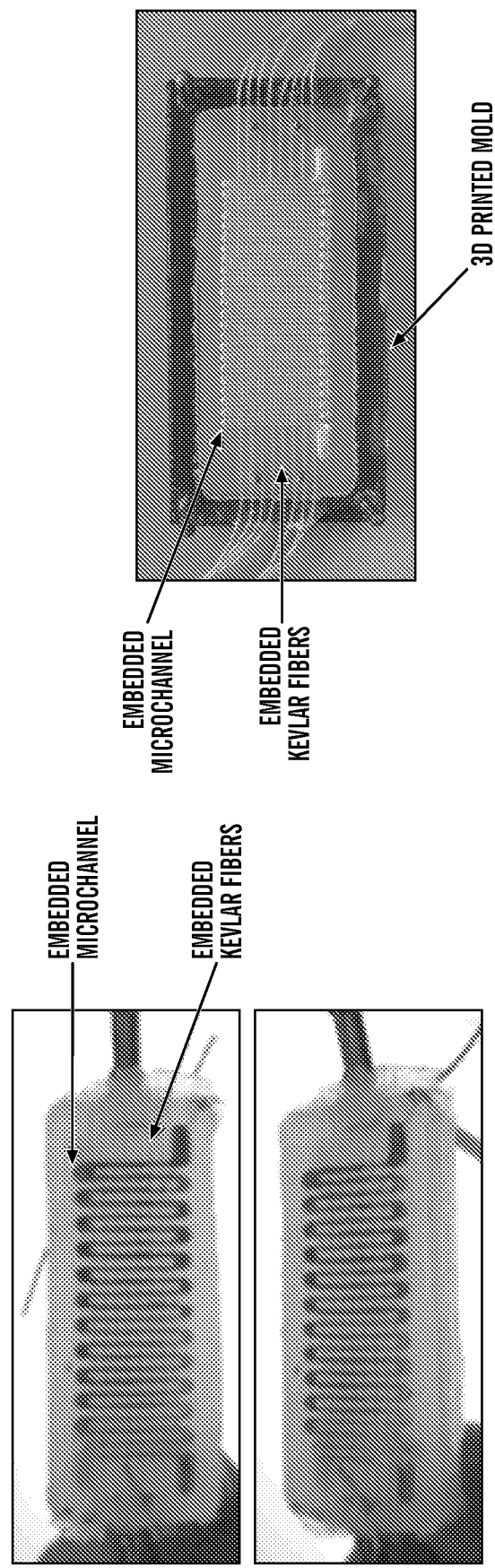
FIG. 10 is a diagram of showing an alternative embodiment of a pneumatic actuator at various stages in the fabrication process according to the invention.
Figures 11A, 11B:
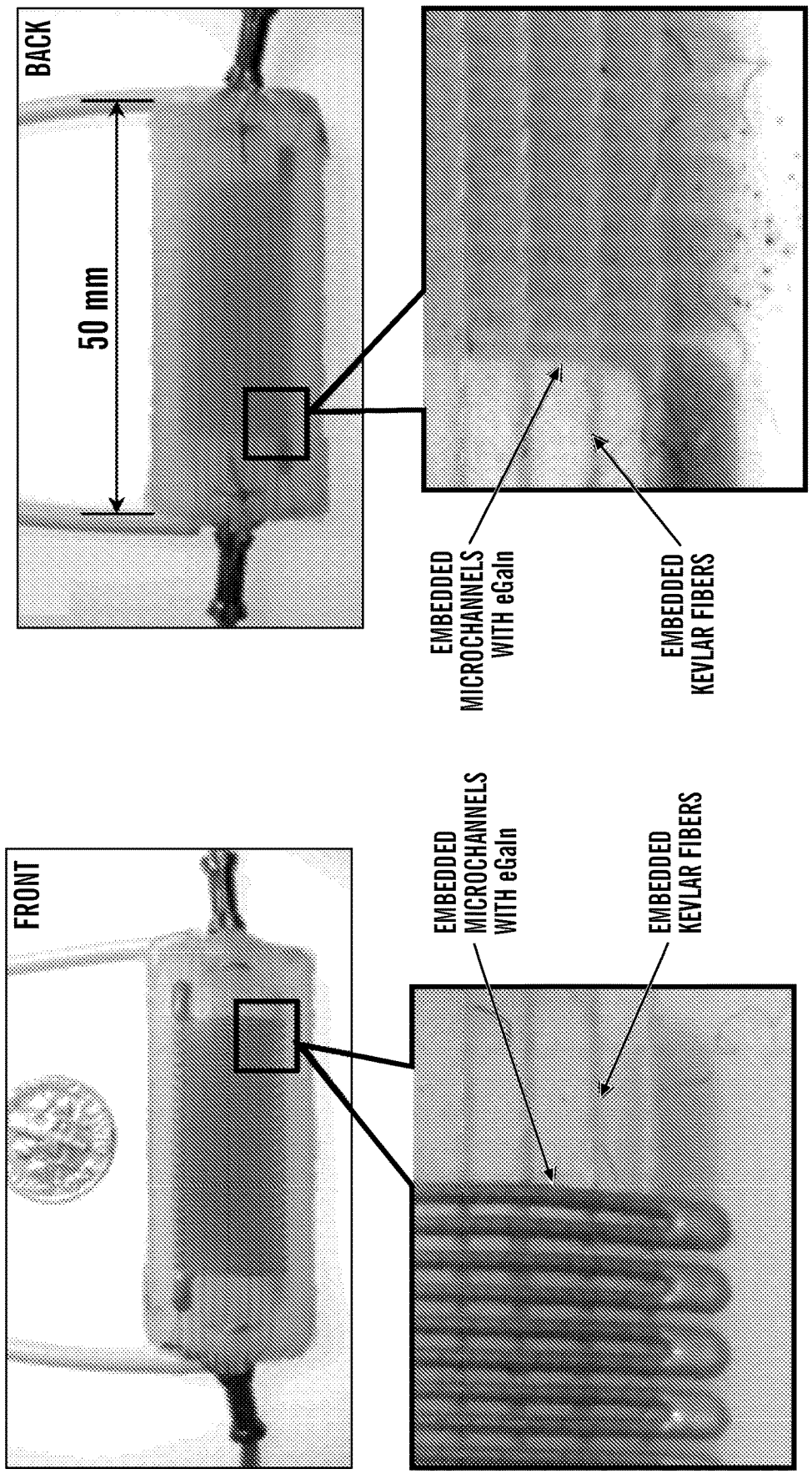
FIGS. 11(a) and 11(b) show a sensor integrated into a single unit actuator.
Figures 12A, 12B, 12C:
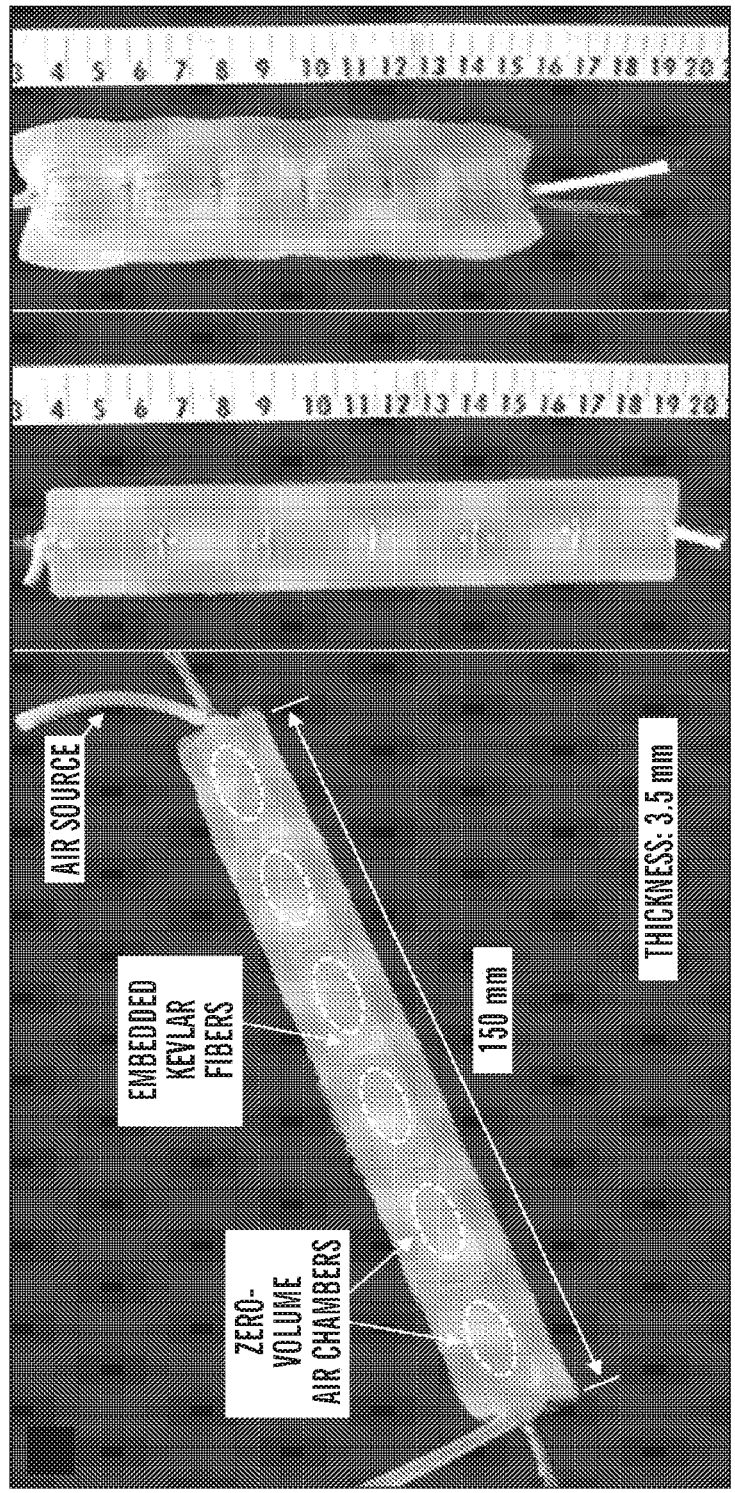
FIGS. 12(a), 12(b) and 12(c) show a multi-cell pneumatic actuator according to the invention with multiple embedded zero-volume air chambers.

One example of an actuator according to the invention and its intermediate fabrication stages are shown in FIGS. 10(a) and 10(b). FIG. 10(a) shows the front and back sides of the completed device. FIG. 10(b) shows the fibers and a sensor layer bonded in 3D printed mold. Detailed views of one completed prototype according to the invention are shown in FIGS. 11(a) and 11(b). FIG. 11(a) shows front side with the sensor layer over the fiber layer. FIG. 11(b) shows the back side with the fiber layer over the sensor layer. The actuator shown in FIGS. 10(a), 10(b) and 11(a), 11(b) has a single unit zero-volume air chamber and embedded microchannels in multiple flat layers. By connecting or fabricating the actuators in series along their axis, a group of multiple flat actuators can be made, as shown in FIG. 12. The example shown in FIG. 12 has the capability of more than 25% contraction. While a serial configuration of multiple muscles increases the contraction length, a parallel configuration may be used to increase the contraction force.

Figure 13B:
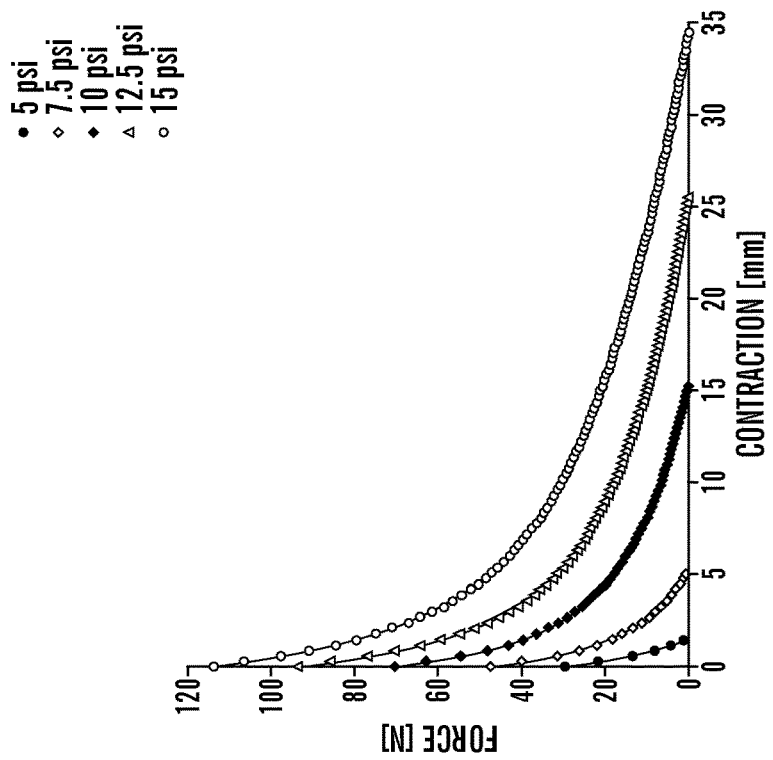
FIGS. 13(a) and 13(b) show an example of a characterization system for a multi-cell actuator according to the invention.
Figure 13A:
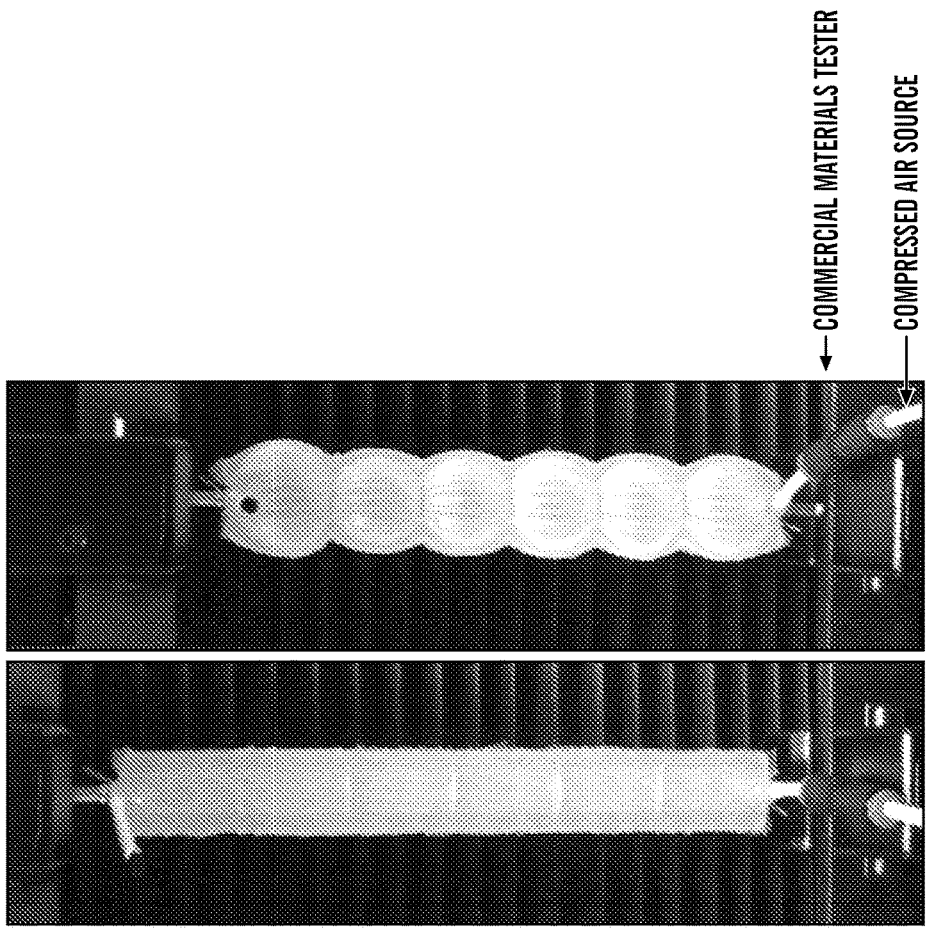

FIGS. 13(a) and 13(b) show an example of a characterization system and an example of a resulting characterization of a multi-cell actuator according to one embodiment of the invention. As shown in FIG. 13(a), the characterization system can include a commercial material stress/strain tester and the multi-cell actuator can be tested by injecting compressed air into the actuator at predefined pressures (e.g., 5, 7.5, 10, 12.5 and 15 psi). The contraction force and length can be measured for different air pressures using a commercial materials tester. FIG. 13(b) shows the characterization result including the force and contraction curves for each air pressure value.

FIGS. 14A, 14B and 14C show a diagram of an alternative method for forming the helical microchannels 1330 in the elastomer material according to some embodiments of the invention. In this method, the helical channel can be produced in a substantially straight and flat layer as shown in FIG. 13A. The microchannel can be formed by molding a base layer with a microchannel and then bonding a layer over it or by molding the layer using a low-friction fiber, such as the Dyneema, or Spectra fiber identified above. After the microchannel layer has cured, it can be wrapped in a helical or other fashion around an inner mold and inserted into an outer mold as shown in FIG. 14B. The inextensible fibers 1324 can be held in place in the mold as liquid elastomer is poured or injected into the mold cavity forming a layer that includes both microchannels 1330 and inextensible fiber 1324. After curing, shown in FIG. 14C, the resulting tubular component can be removed from the mold and used to construct a pneumatic actuator according to the invention. An outer layer providing a second microchannel 1330 can be added to resulting tubular component shown FIG. 13C, by wrapping a second microchannel layer around the tubular component and pouring or injecting liquid elastomer to form an outer layer similar to the method shown in FIG. 14B.

Other embodiments are within the scope and spirit of the invention. Further, while the description above refers to the invention, the description may include more than one invention.

What is claimed is:

1. A pneumatic actuator formed of an elastic material, the pneumatic actuator comprising:
a chamber extending along an axis from a first end to a second end;
an inlet connected to the chamber to enable a fluid to be injected into the chamber;
a plurality of flexible fibers coupled to the first end and the second end;
a first sensor layer extending along the axis from the first end to the second end and coupled to the actuator, whereby when a fluid is injected into the chamber causing the chamber to expand, the first sensor layer is caused to expand; and
wherein the first sensor layer includes a first microchannel containing a conductive liquid extending along a portion of the actuator whereby expansion of the first sensor layer causes a change in at least one dimension of the first microchannel and a change in electrical resistance of the conductive liquid in the first microchannel,
wherein the first sensor layer forms a cylinder that encircles the chamber and the plurality of flexible fibers forms a cylinder that encircles the first sensor layer and further comprising a second sensor layer formed in a cylinder that encircles the plurality of flexible fibers;
wherein the second sensor layer includes a second microchannel containing a conductive liquid extending along a portion of the actuator whereby expansion of the second sensor layer causes a change in at least one dimension of the second microchannel and a change in electrical resistance of the conductive liquid in the second microchannel.

2. A pneumatic actuator formed of an elastic material, the pneumatic actuator comprising:
a first layer forming a chamber extending along an axis from a first end to a second end;
an inlet connected to the chamber to enable a fluid to be injected into the chamber;
a second layer including a plurality of flexible fibers coupled to the first end and the second end;
a first sensor layer extending along the axis from the first end to the second end and coupled to the actuator, whereby when a fluid is injected into the chamber causing the chamber to expand, the first sensor layer is caused to expand; and
wherein the first sensor layer includes a first microchannel containing a conductive liquid extending along a portion of the actuator whereby expansion of the first sensor layer causes a change in at least one dimension of the first microchannel and a change in electrical resistance of the conductive liquid in the first microchannel,
wherein the first layer includes a first side and a second side and the second layer is bonded to the first side of the first layer and the first sensor layer is bonded to the second side of the first layer, and
wherein the pneumatic actuator further includes
a second sensor layer bonded to the second layer, the second sensor layer extending along the axis from the first end to the second end and coupled to the actuator, whereby when a fluid is injected into the chamber causing the chamber to expand, the second sensor layer is caused to expand; and wherein the second sensor layer includes a second microchannel containing a conductive liquid extending along a portion of the actuator whereby expansion of the second sensor layer causes a change in at least one dimension of the second microchannel and a change in electrical resistance of the conductive liquid in the second microchannel; and
a third layer bonded to the first sensor layer, the third layer including a plurality of flexible fibers coupled to the first end and the second end.

3. A method of making a pneumatic actuator comprising
molding a first layer of an elastic material, the first layer having a first surface;
applying a release material in a predefined pattern on the first surface to define a fluid chamber;
bonding a second layer of an elastic material to the first surface containing the release material, whereby the second layer bonds to the first surface except in an area of the first surface where the release material was applied;
bonding a first sensor layer to the second layer, the first sensor layer including a first microchannel containing a conductive liquid extending along a portion of the actuator whereby expansion of the first sensor layer causes a change in at least one dimension of the first microchannel and a change in electrical resistance of the conductive liquid in the first microchannel.

4. The method according to claim 3 further comprising positioning a negative mask on the first surface of the first layer and applying the release material over the negative mask.

5. The method according to claim 3 wherein bonding the second layer of elastic material includes molding the second layer of elastic material on the first surface of the first layer.

6. A method of making a pneumatic actuator comprising
molding a first layer of an elastic material, the first layer having a first surface;
applying a release material in a predefined pattern on the first surface to define a fluid chamber extending along an axis from a first end to a second end;
bonding a second layer of an elastic material to the first surface containing the release material, whereby the second layer bonds to the first surface except in an area of the first surface where the release material was applied;
bonding a third layer to the second layer, the third layer including a plurality of flexible fibers extending along the axis from the first end to the second end.

7. The method according to claim 6 further comprising positioning a negative mask on the first surface of the first layer and applying the release material over the negative mask.

8. The method according to claim 6 wherein bonding the second layer of elastic material includes molding the second layer of elastic material on the first surface of the first layer.

9. A method of making a pneumatic actuator comprising
forming a first layer of an elastic material, the first layer having a first surface;
applying a layer liquid elastomer in a predefined pattern on the first surface to define a fluid chamber;
bonding a second layer of the liquid elastic material on the first surface containing, whereby the second layer bonds to the first surface in the area where the liquid elastomer was applied;
bonding a first sensor layer to the second layer, the first sensor layer including a first microchannel containing a conductive liquid extending along a portion of the actuator whereby expansion of the first sensor layer causes a change in at least one dimension of the first microchannel and a change in electrical resistance of the conductive liquid in the first microchannel.

10. The method according to claim 9 further comprising positioning a mask on the first surface of the first layer and applying the layer of liquid elastomer over the mask.

11. The method according to claim 9 wherein bonding the second layer of elastic material includes bonding a layer of cured elastic material to the layer of liquid elastomer on the first surface of the first layer.

12. A method of making a pneumatic actuator comprising
forming a first layer of an elastic material, the first layer having a first surface;
applying a layer liquid elastomer in a predefined pattern on the first surface to define a fluid chamber;
bonding a second layer of the liquid elastic material on the first surface, whereby the second layer bonds to the first surface in the area where the liquid elastomer was applied;
bonding a third layer to the second layer, the third layer including a plurality of flexible fibers extending along the axis from the first end to the second end.

13. The method according to claim 12 further comprising positioning a mask on the first surface of the first layer and applying the layer of liquid elastomer over the mask.

14. The method according to claim 12 wherein bonding the second layer of elastic material includes bonding a layer of cured elastic material to the layer of liquid elastomer on the first surface of the first layer.

15. A method of making a pneumatic actuator comprising:
forming a base layer having an embedded microchannel;
positioning the base layer in a mold;
molding the base layer into the pneumatic actuator by adding liquid elastomer into the mold and allowing the liquid elastomer to cure.

16. The method of making a pneumatic actuator according to claim 15 wherein the base layer is formed by molding a low friction fiber into the base layer, allowing the base layer to cure, and removing the low friction fiber from the cured base layer.

17. The method of making a pneumatic actuator according to claim 16 further comprising a mold wherein the mold is circular and includes an inner post.

18. The method of making a pneumatic actuator according to claim 15 further comprising positioning flexible fibers in the mold prior to adding the liquid elastomer.

19. A pneumatic actuator formed of an elastic material, the pneumatic actuator comprising:
a chamber extending along an axis from a first end to a second end;
an inlet connected to the chamber to enable a fluid to be injected into the chamber;
a plurality of flexible fibers coupled to the first end and the second end;
a first sensor layer extending along the axis from the first end to the second end and coupled to the actuator, whereby when a fluid is injected into the chamber causing the chamber to expand, the first sensor layer is caused to expand; and
wherein the first sensor layer includes a first microchannel containing a conductive liquid extending along a portion of the actuator whereby expansion of the first sensor layer causes a change in at least one dimension of the first microchannel and a change in electrical resistance of the conductive liquid in the first microchannel,
wherein the elastic material forms a substantially flat body having a first and a second side,
wherein the first sensor layer forms a layer that is bonded to the second side of the flat body,
wherein the plurality of flexible fibers forms part of a fiber layer that is bonded to the first sensor layer that is bonded to the second side of the flat body,
the pneumatic actuator further comprising a second fiber layer, including a plurality of flexible fibers coupled to the first end and the second end, bonded to the first side of the flat body; and
a second sensor layer bonded to the second fiber layer, whereby when a fluid is injected into the chamber causing the chamber to expand, the second sensor layer is caused to expand; and
wherein the second sensor layer includes a second microchannel containing a conductive liquid extending along a portion of the actuator whereby expansion of the second sensor layer causes a change in at least one dimension of the second microchannel and a change in electrical resistance of the conductive liquid in the second microchannel.

20. The pneumatic actuator according to claim 19 wherein the plurality of flexible fibers forms part of a fiber layer bonded to the first side of the flat body.

21. The pneumatic actuator according to claim 20 wherein the first sensor layer forms a layer that is bonded to the fiber layer that is bonded to the first side of the flat body.

* * * * *